US012577999B2

(12) United States Patent
Yavas et al.

(10) Patent No.:  US 12,577,999 B2
(45) Date of Patent:      Mar. 17, 2026

(54) ABSORBER

(71) Applicant: TUSAS- TURK HAVACILIK VE UZAY SANAYII ANONIM SIRKETI, Ankara (TR)

(72) Inventors: Hakan Yavas, Ankara (TR); Murat Koksal, Ankara (TR); Ahmet Alptug Tanrikulu, Ankara (TR); Akin Dagkolu, Ankara (TR); Atayil Koyuncu, Ankara (TR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 373 days.

(21) Appl. No.: 18/268,482

(22) PCT Filed: May 25, 2021

(86) PCT No.: PCT/TR2021/050483
§ 371 (c)(1),
(2) Date: Jun. 20, 2023

(87) PCT Pub. No.: WO2022/146285
PCT Pub. Date: Jul. 7, 2022

(65) Prior Publication Data
US 2024/0035534 A1      Feb. 1, 2024

(30) Foreign Application Priority Data

Dec. 30, 2020      (TR)  ................................. 2020/22444

(51) Int. Cl.
F16F 7/12          (2006.01)
B22F 10/28          (2021.01)
(Continued)

(52) U.S. Cl.
CPC ................ F16F 7/00 (2013.01); B22F 10/28 (2021.01); B33Y 80/00 (2014.12); *F16F 2228/007* (2013.01); *F16F 2234/02* (2013.01)

(58) Field of Classification Search
CPC .... F16F 7/00; F16F 2228/007; F16F 2234/02; F16F 7/121; B33Y 80/00; B22F 10/28
See application file for complete search history.

(56) References Cited

U.S. PATENT DOCUMENTS

| | | | |
|---|---|---|---|
| 9,995,359 B2 * | 6/2018 | Martino Gonzalez | .... B32B 1/08 |
| 10,066,508 B2 * | 9/2018 | Geiger | .................... F01D 25/26 |

(Continued)

FOREIGN PATENT DOCUMENTS

| | | |
|---|---|---|
| CN | 109365787 A | 2/2019 |
| CN | 111396486 A | 7/2020 |

(Continued)

OTHER PUBLICATIONS

International Search Report and Written Opinion for PCT application No. PCT/TR2021/050483, mailed Aug. 10, 2021.

(Continued)

*Primary Examiner* — Thomas W Irvin
(74) *Attorney, Agent, or Firm* — Notaro, Michalos & Zaccaria P.C.

(57) ABSTRACT

An absorber that has at least one source provided in air and/or space vehicles, transmitting vibrations to the vehicle, a bracket disposed under the source, allowing the source to be fixed into the air and/or space vehicle, at least one first part with a negative Poisson's ratio, at least one second part with a positive Poisson's ratio, and at least one apparatus (Continued)

disposed between the source and the bracket, having the first part and the second part and enabling an almost complete absorption of the vibrations transmitted by the source.

11 Claims, 3 Drawing Sheets

(51) Int. Cl.
  B33Y 80/00     (2015.01)
  F16F 7/00      (2006.01)

(56)            References Cited

U.S. PATENT DOCUMENTS

| | | | | |
|---|---|---|---|---|
| 10,878,791 | B2 * | 12/2020 | Martino González | B32B 3/18 |
| 2014/0161601 | A1 * | 6/2014 | Geiger | F01D 21/045 |
| | | | | 415/213.1 |
| 2017/0058985 | A1 * | 3/2017 | Martino González | B32B 3/12 |
| 2018/0174565 | A1 * | 6/2018 | Martino González | B32B 3/04 |
| 2018/0265023 | A1 * | 9/2018 | Faruque | F16F 7/121 |
| 2019/0202163 | A1 * | 7/2019 | Yeh | B32B 3/30 |
| 2019/0271237 | A1 * | 9/2019 | Martin | F01D 25/26 |
| 2020/0080611 | A1 * | 3/2020 | Blank | F01D 5/18 |
| 2020/0114850 | A1 * | 4/2020 | Faruque | F16F 7/121 |
| 2023/0212372 | A1 * | 7/2023 | Tsay | B33Y 80/00 |
| | | | | 106/476 |
| 2024/0000182 | A1 * | 1/2024 | Weber | A42B 3/124 |

FOREIGN PATENT DOCUMENTS

| | | |
|---|---|---|
| CN | 211820515 U | 10/2020 |
| EP | 3339677 A1 | 6/2018 |

OTHER PUBLICATIONS

International Preliminary Report on Patentability, completed Mar. 27, 2023.
Demand/Request for Preliminary Examination dated Oct. 21, 2022.
Written Opinion of the International Preliminary Examining Authority dated Dec. 7, 2022.
Response to Office Action dated Jan. 31, 2023.
International Application Status Report generated May 16, 2023.

* cited by examiner

ABSORBER

FIELD

The present invention relates to the absorption of vibrations by means of negative and positive Poisson's ratio hybrid structures.

BACKGROUND

With the rapid development of space technologies, the importance of large aperture and high resolution space cameras in the fields of civil, commercial, military and astronomy has been increasing. However, micro vibrations with low amplitude and wide frequency range formed by disruptive vibration sources on space vehicles significantly reduce the imaging quality of the space cameras. Reaction wheels are at the forefront of these sources because they provide the orientation movements of the satellites. These units are one of the main components of many space vehicles for different purposes and continue to operate during the operation of units such as camera antennas and produce micro vibrations. Micro vibrations are complex perturbations that are difficult to measure and suppress, since they are of low amplitude and able to occur in a wide frequency range. The fact that these vibrations occur on platforms that cannot be intervened during their operation requires simple and reliable solutions. The materials to be used in space systems have peculiar requirements other than aviation and general engineering requirements due to their different working conditions. Space parts developed for reasons such as gravitational variation or the natural vacuum environment of space are expected to undergo a precise mechanical and thermal characterization process. For this reason, the use of metallic materials can provide significant advantages. Additionally, the absorption performances of the absorbers used at low frequencies should be sufficient. The lowest frequency they can absorb depends on how low the stiffness coefficients of the absorbers are. These stiffness coefficients should be selected to ensure that the natural frequencies that the absorbers will bring to the system they carry are lower than the vibration frequencies that strains the system. This causes the metallic bracket structures to be too rigid for passive absorption. This is because reducing the stiffness of bracket structures with conventional methods will also reduce the strength of these structures against other loads foreseen in space applications.

It offers an innovative design approach based on said optimization triangle, especially in space applications, taking into account said design criteria. The invention works with the principle of distributing two basic geometric structures within each other and thus optimizing the net mechanical effect. As mentioned, polymer-based rubber structures are used as vibration absorbing materials in equipment connections where the vibration criterion is important. However, polymer-based materials used in space systems should be developed as space-qualified, i.e. the material outgassing properties in space environment are expected to meet the space criteria. Otherwise, materials in the vacuum environment may suffer mass loss and cause significant damages to the space vehicle. The development of relevant space-qualified materials is a very difficult process. Instead of said polymeric materials, an approach is presented that also takes into account the weight gain. Here, it is the basic approach to create low stiffness values especially in load connection regions of structures such as brackets by using negative and positive Poisson's ratio structures together.

The Poisson's ratio is defined as the negative of the ratio of transverse strain to axial strain for a uniaxial stress state. If a tensile load is applied to a material, the material will extend in the direction in which the load is applied. If, on the contrary, a compressive load is applied, the material will be narrowed in the direction perpendicular to the compressive load. If it is assumed that the total amount of matter is fixed, the material shall meet the dimensional change by getting narrowed or expanded in the axial area. Said axial-lateral area shape change relationship is called as the Poisson's ratio after the name of its inventor. In nature, materials usually show a positive Poisson's ratio, i.e. they contract under tensile loads, while they expand under compressive loads. However, together with the introduction of additive manufacturing technologies in engineering applications, it has become possible to produce shapes with complex geometries and thus the possibility of manipulating the Poisson's ratio has been improved. Negative and positive Poisson's ratio structures will be arranged perpendicular to the vibration load to obtain regions with low stiffness coefficients, especially on the reaction wheel bracket connection interfaces. Lateral deformations due to pressure or traction loads in positive and negative Poisson's ratio regions will tend in the same direction and thus these regions will not resist each other's lateral deformations and will reduce the total stiffness value of the region.

The European Patent Office patent application document EP3339677B1, which is included in the known state of the art, describes an energy absorbing structure for providing protection against mechanical and acoustic effects used in air vehicles. In addition to the materials with different Poisson's ratios, it is mentioned on an elastomeric component positioned in between them.

In another patent application document US20180265023A1, is related to energy absorbing structures and methods of making structures that are adaptable to meet collision test requirements with different size targets having different masses at different speeds. The energy absorbing structures is disclosed that includes a cover defining a cavity and a lattice core. The lattice core includes rod-shaped links having first and second ends connected at spaced nodes to form a three dimensional structure disposed inside the cavity.

SUMMARY

Thanks to an absorber developed by this invention, it is intended to provide the required absorption of vibrations, in particular microvibrations, by observing the stiffness coefficient without reducing the strength of the bracket structure.

Another object of this invention is to ensure that the developed absorber is practical, effective, efficient and reliable, to extend its service life and to provide weight gain. Weight reduction is vital especially in space systems.

In order to achieve the object of this invention, the absorber defined in the first claim and in the claims dependent thereon, comprises at least one source used in air and/or space vehicles, causing vibrations to occur during its operation in addition to its function, a bracket for attaching the source thereto, thereby allowing the source to be attached to the site where the source is to function, at least one first part with negative Poisson's ratio due to its design, at least one second part with positive Poisson's ratio due to its design, at least one apparatus attached to both the source and the bracket so as to be positioned in between them, comprising the first part and the second part and allowing to almost completely eliminate the vibrations caused by the source.

The absorber of the invention comprises at least one apparatus in which the first part and the second part formed in one piece using an additive manufacturing method from a single material are kept together.

In an embodiment of the invention, the absorber comprises an apparatus obtained by producing the negative and positive Poisson's ratio parts in one piece, such that one of the parts is located in the center and the other one surrounds the other.

In an embodiment of the invention, the absorber comprises an apparatus obtained by producing the negative and positive Poisson's ratio parts in one piece, such that the negative Poisson's ratio part is located in the center and the positive Poisson's ratio part surrounds the other.

In an embodiment of the invention, the absorber comprises an apparatus obtained by producing the negative and positive Poisson's ratio parts in one piece, such that the negative Poisson's ratio part extends radially in the direction perpendicular to the direction of the vibration load and the positive Poisson's ratio part surrounds the other part in a circular manner.

In an embodiment of the invention, the absorber comprises an apparatus obtained by producing the negative and positive Poisson's ratio parts in one piece in a circular form.

In an embodiment of the invention, the absorber comprises an apparatus in which the absorption function is carried out with a metallic material.

In an embodiment of the invention, the absorber comprises an apparatus formed by bringing together parts made of AlSi10Mg or AlSi7Mg materials to carry out the absorption function.

In an embodiment of the invention, the absorber comprises a body formed by attaching more than one apparatus to the bracket.

In an embodiment of the invention, the absorber comprises a body formed by attaching the apparatuses to six points, which are equidistant to each other, on the bracket.

In an embodiment of the invention, the absorber comprises a body formed by producing the bracket and the apparatus in one piece.

In an embodiment of the invention, the absorber comprises a plate that provides the connection between the source and the apparatus and allows the source to be directed to the apparatus in order to enable the absorption of vibrations caused by the source.

In an embodiment of the invention, the absorber comprises a plate having almost the same form as the apparatus, which can be mounted on the apparatus in a removable manner.

In an embodiment of the invention, the absorber comprises an apparatus in which a powder bed additive manufacturing method is used as the production method.

In an embodiment of the invention, the absorber comprises a body in which a powder bed additive manufacturing method is used as the production method.

BRIEF DESCRIPTION OF THE DRAWINGS

The absorber realized to achieve the object of the present invention is shown in the accompanying figures, wherein from these figures.

DETAILED DESCRIPTION

Figure 1:
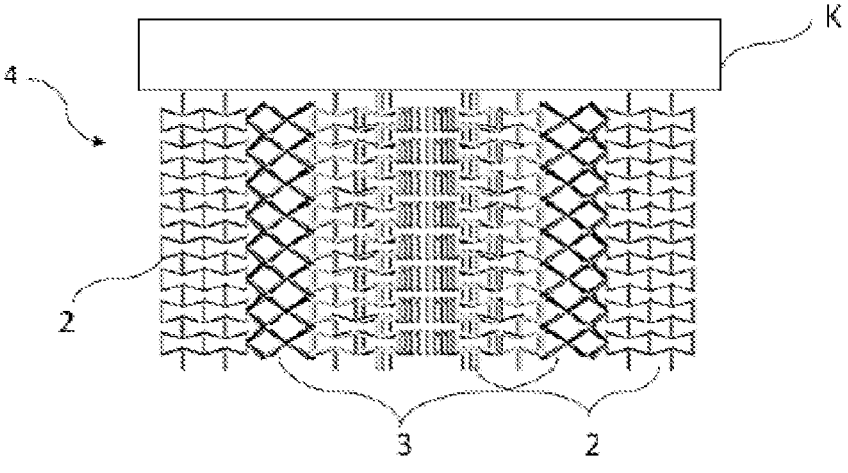
FIG. 1 is a cross-sectional view of the apparatus.

The parts illustrated in figures are individually assigned a reference numeral and the corresponding terms of these numbers are listed below.

1. Absorber
2. First part
3. Second part
4. Apparatus
5. Body
6. Plate
(K) Source
(B) Bracket The absorber (1) comprises at least one source (K) provided in air and/or space vehicles, transmitting vibrations to the vehicle, a bracket (B) disposed under the source (K), allowing the source (K) to be fixed into the air and/or space vehicle, at least one first part (2) with a negative Poisson's ratio, at least one second part (3) with a positive Poisson's ratio, and at least one apparatus (4) disposed between the source (K) and the bracket (B), having the first part (2) and the second part (3) and enabling an almost complete absorption of the vibrations transmitted by the source (K). (FIG. 1)

Figure 2:
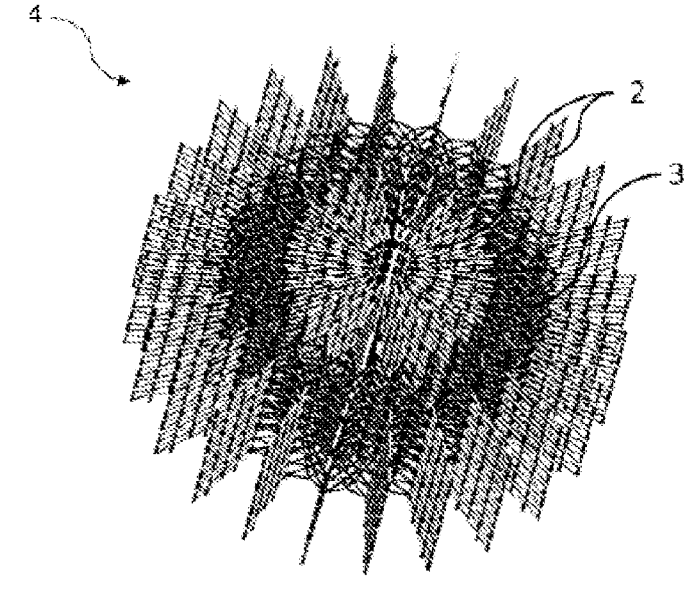
FIG. 2 is a perspective view of the apparatus.

The absorber (1) of the invention comprises at least one apparatus (4) having the first part (2) and the second part (3), which are manufactured from the same material in one piece with each other by an additive manufacturing method. (FIG. 2)

While performing its function, the source (K) causes vibrations to occur in a way that adversely affects the performance of other elements operating in air and/or space vehicles. In order to optimally prevent this vibration, an apparatus (4) formed by bringing together the first part (2) and the second part (3) is used. The apparatus (4) absorbs the vibration by being positioned between the bracket (B) enabling to mount the source (K) to the vehicle and the source (K) itself.

By producing the first part (2) and the second part (3) in one piece, an absorber (1) with a low stiffness coefficient is obtained. Nevertheless, the durability of the bracket (B) is prevented from decreasing. Producing in one piece the first part (2) and the second part (3) with different Poisson's ratios to form the apparatus (4) is enabled by additive manufacturing methods.

In an embodiment of the invention, the absorber (1) comprises an apparatus (4) having a first part (2) and a second part (3) in a consecutive manner radially from the center towards the exterior, at least one of the first part (2) or the second part (3) being disposed in the center and at least the other one completely surrounding the former. By creating a design space in this way, the one that will perform the optimum absorption is selected among the designs of different apparatuses (4) with the first part (2) and the second part (3), functioning to carry out absorption. (FIG. 2)

Figure 3:
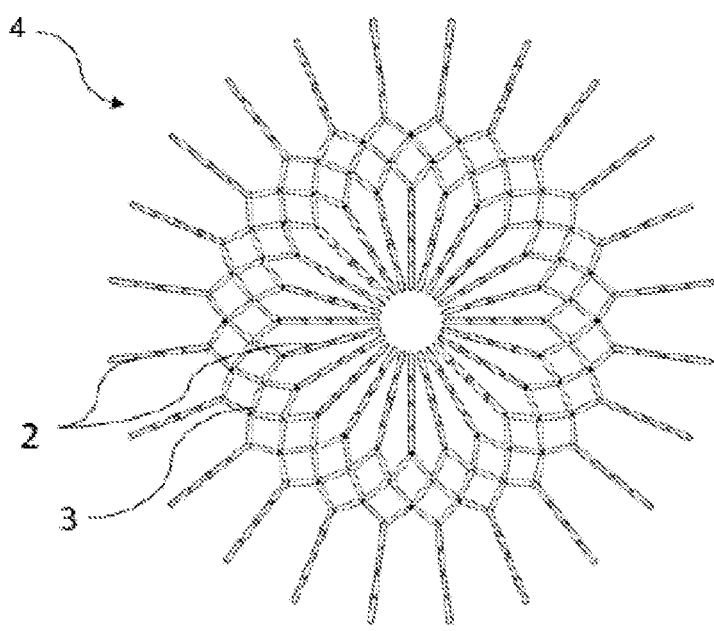
FIG. 3 is a top view of the apparatus.

In an embodiment of the invention, the absorber (1) comprises an apparatus (4) having a first part and a second part in a consecutive manner radially from the center towards the exterior, the first part (2) being disposed in the center and the second part (3) almost completely surrounding the first part (2). The relationship between the first part (2) and the second part (3) is defined. Thus, an optimum absorber (1) is provided wherein the apparatus (4) will minimize the vibrational movement of the reaction wheels. (FIG. 3)

In an embodiment of the invention, the absorber (1) comprises an apparatus (4) having a first part (2) extending radially from the center almost perpendicularly towards the exterior and a second part (3) circularly surrounding the center. The relationship between the first part (2) and the second part (3) is defined. Thus, an optimum absorber (1) is provided wherein the apparatus (4) will minimize the vibrational movement of the reaction wheels. (FIG. 3)

In an embodiment of the invention, the absorber (1) comprises an apparatus (4) having a first part (2) and a second part (3) with a circular form respectively. The relationship between the first part (2) and the second part (3) is defined. Thus, an optimum absorber (1) is provided wherein the apparatus (4) will minimize the vibrational movement of the reaction wheels.

In an embodiment of the invention, the absorber (1) comprises an apparatus (4) produced from a metallic material. Thus, a substantial reduction occurs in the weight of apparatus (4) and therefore of the absorber (1). This is a very important gain, especially for space vehicles.

In an embodiment of the invention, the absorber (1) comprises an apparatus (4) produced from AlSi10Mg or AlSi7Mg materials. AlSi10Mg or AlSi7Mg are materials suitable for space conditions. Thus, an absorber (1) that meets the reliability criteria is produced.

Figure 4:
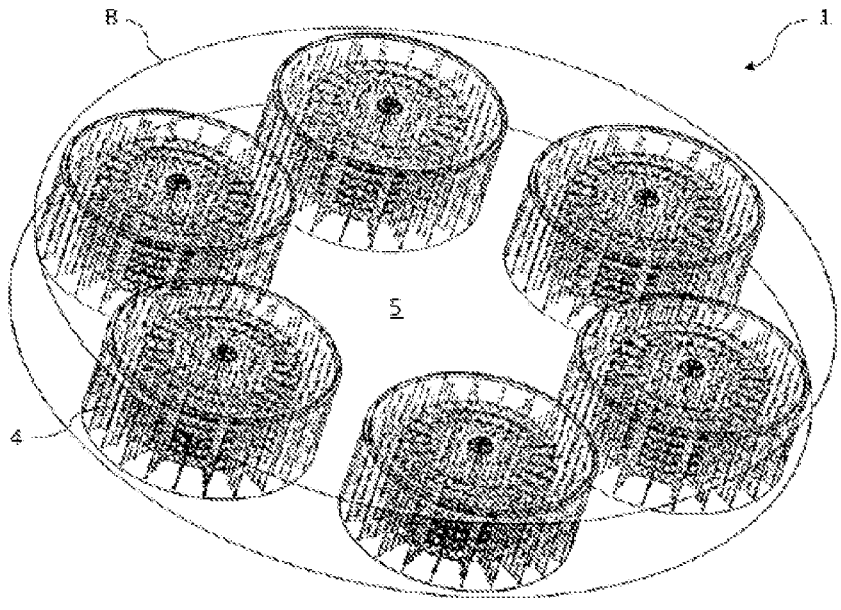
FIG. 4 is a perspective view of the absorber.

In an embodiment of the invention, the absorber (1) comprises a bracket (B) and a body (5) having more than one apparatus (4) located on the bracket (B). In this way, the absorption function is distributed to more than one apparatus (4), reducing its loads and obtaining a more reliable absorber (1). It is fixed to the source (K) means through a connection made with the bracket (B). (FIG. 4)

In an embodiment of the invention, the absorber (1) comprises a body (5) having apparatuses (4) located at the corners of an equilateral hexagon on the bracket (B). Thus, the absorption function is distributed homogeneously to the apparatuses (4).

In an embodiment of the invention, the absorber (1) comprises a monolithically produced bracket (B) and a body (5) with an apparatus (4). This ensures weight reduction and reliability.

Figure 5:
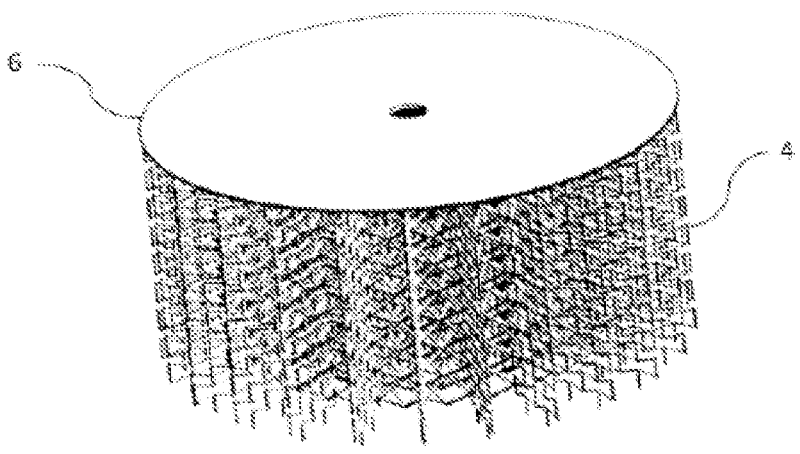
FIG. 5 is a perspective view of the apparatus.

In an embodiment of the invention, the absorber (1) comprises at least one plate (6) located 35 between the source (K) and the apparatus (4) and enabling the vibration transmitted from the source (K) to be homogeneously distributed over the apparatus (4). The plate (6) provides the connection between the source (K) and the apparatus (4) and allows the vibrations coming from the source (K) to be absorbed once they reach the absorber (1). (FIG. 5)

In an embodiment of the invention, the absorber (1) comprises a plate (6) with a circular form that almost completely covers the apparatus (4) and is detachably attached to the apparatus (4). This ensures that the vibrations reach the absorber (1) in a homogeneous manner.

In an embodiment of the invention, the absorber (1) comprises an apparatus (4) produced with powder-bed additive manufacturing machines. In this way, the first part (2) and the second part (3) are produced in one piece.

In an embodiment of the invention, the absorber (1) comprises a body (5) produced with powder-bed additive manufacturing machines. In this way, the first part (2) and the second part (3) are produced in one piece.

The invention claimed is:

1. An absorber (1) comprising:
   at least one source (K) provided in air and/or space vehicles, transmitting vibrations to the vehicle,
   a bracket (B) disposed under the source (K), allowing the source (K) to be fixed into the air and/or space vehicle,
   at least one first part (2) with a negative Poisson's ratio,
   at least one second part (3) with a positive Poisson's ratio,
   at least one apparatus (4) disposed between the source (K) and the bracket (B), having the first part (2) and the second part (3) and enabling an almost complete absorption of the vibrations transmitted by the source (K),
   wherein the first part (2) and the second part (3) comprised by the apparatus (4) are manufactured from the same material in one piece with each other by an additive manufacturing method and arranged in a consecutive manner radially from the center towards the exterior such that at least one of the first part (2) or the second part (3) is disposed in the center and at least the other one almost completely surrounds the one in the center; and
   wherein the apparatus (4) is produced from AlSi10Mg or AlSi7Mg materials, and wherein the body (5) has apparatuses (4) located at the corners of an equilateral hexagon on the bracket (B).

2. The absorber (1) as claimed in claim 1, wherein the first part (2) and the second part (3) comprised by the apparatus (4) are arranged in a consecutive manner radially from the center towards the exterior such that the first part (2) is disposed in the center and the second part (3) almost completely surrounds the first part (2).

3. The absorber (1) as claimed in claim 1, wherein the first part (2) comprised by the apparatus (4) extends radially from the center almost perpendicularly towards the exterior and that the second part (3) comprised by the apparatus circularly surrounds the center.

4. The absorber (1) as claimed in claim 1, wherein the first part (2) and the second part (3) comprised by the apparatus (4) have a circular form.

5. The absorber (1) as claimed in claim 1, wherein the apparatus (4) is produced from a metallic material.

6. The absorber (1) as claimed in claim 1, comprising a body (5) having a bracket (B) and more than one apparatus (4) located on the bracket (B).

7. The absorber (1) as claimed in claim 1, wherein the body (5) has a monolithically produced bracket (B) and an apparatus (4).

8. The absorber (1) as claimed in claim 1, characterized by at least one plate (6) located between the source (K) and the apparatus (4) and enabling the vibration transmitted from the source (K) to be homogeneously distributed over the apparatus (4).

9. The absorber (1) as claimed in claim 8, wherein the at least one plate (6) has a circular form, almost completely covers the apparatus (4) and is detachably attached to the apparatus (4).

10. The absorber (1) as claimed in claim 1, wherein the apparatus (4) is produced by powder-bed additive manufacturing machines.

11. The absorber (1) as claimed in claim 1, wherein the body (5) is produced by powder-bed additive manufacturing machines.

\* \* \* \* \*